Aug. 5, 1924.

H. C. MAISE

COWL VENTILATOR

Filed Dec. 27, 1922

Inventor

Herman C. Maise

Attorneys

Aug. 5, 1924.

H. C. MAISE

COWL VENTILATOR

Filed Dec. 27, 1922

Inventor

Herman C. Maise

Attorneys

Patented Aug. 5, 1924.

1,503,840

UNITED STATES PATENT OFFICE.

HERMAN C. MAISE, OF DETROIT, MICHIGAN, ASSIGNOR TO BRIGGS MANUFACTURING COMPANY, OF DETROIT, MICHIGAN, A CORPORATION OF MICHIGAN.

COWL VENTILATOR.

Application filed December 27, 1922. Serial No. 609,203.

*To all whom it may concern:*

Be it known that I, HERMAN C. MAISE, a citizen of the United States of America, residing at Detroit, in the county of Wayne and State of Michigan, have invented certain new and useful Improvements in Cowl Ventilators, of which the following is a specification, reference being had therein to the accompanying drawings.

The invention relates to cowl ventilators and has for its object the provision of a simple construction of ventilator which may be readily secured to the cowl of a motor vehicle and which has its cover pivot located below the cowl and concealed thereby. Another object is to provide a handle for rotatably adjusting the cover and also holding the cover in adjusted position. Further objects of the invention reside in the novel features of construction and combination and arrangements of parts as more fully hereinafter set forth.

Figure 1:
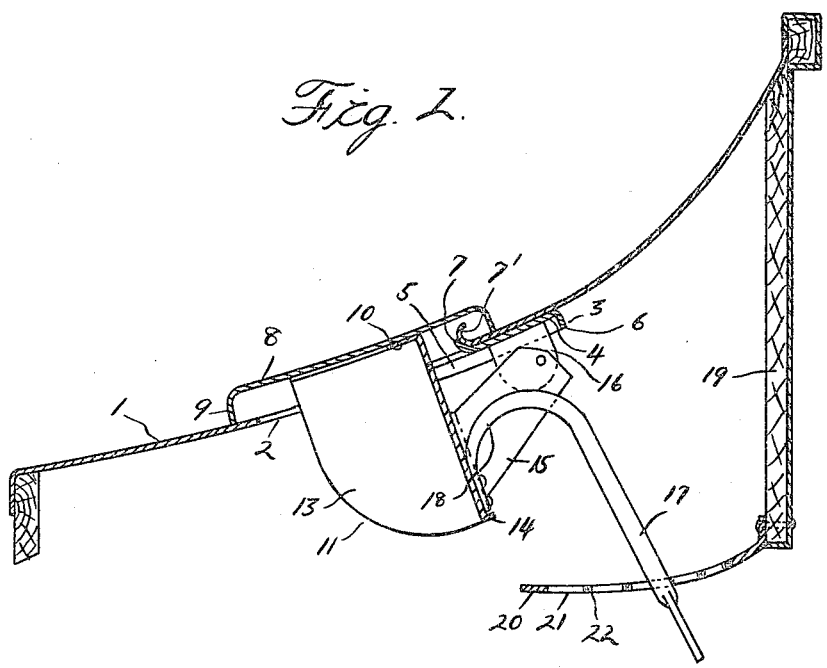
Figure 1 is a section through the cowl of a motor vehicle and a ventilator embodying my invention.
Figure 2:
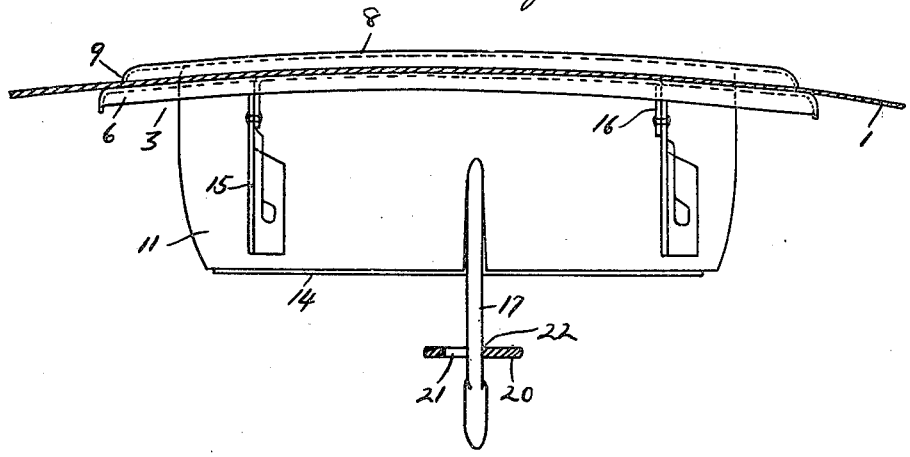
Figure 2 is a rear elevation thereof.
Figure 3:
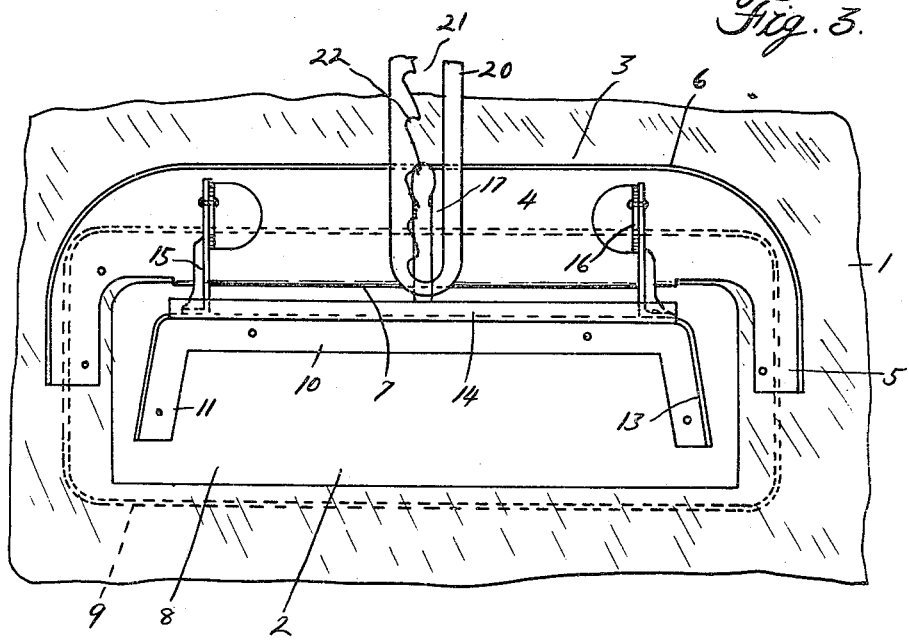
Figure 3 is a bottom plan view thereof.

1 is the cowl of a motor vehicle provided with the opening 2 for the entrance of air into the motor vehicle. 3 is the U-shaped stationary hinge bracket secured to the under side of the cowl 1 by suitable means, such as rivets, the base 4 of the U extending adjacent to the rear edge of the opening 2 and the legs 5 of the U extending adjacent to the side edges of the opening. 6 is a flange depending from the outer edges of the base and legs of the stationary hinge bracket for reinforcing the same, and 7 is an upwardly extending flange at the inner edge of the base and extending through the ventilating opening 2 at its rear edge for reinforcing the upwardly extending flange 7' upon the cowl, which latter flange prevents moisture flowing downwardly along the cowl from entering the motor vehicle through the ventilating opening.

8 is the ventilator cover having the depending peripheral flange 9 of a sufficient height to embrace the upwardly extending flange 7' and still contact with the upper side of the cowl on all sides of the ventilating opening when the cover is in closed position. This cover is fixedly secured as by spot welding, to the bifurcations of the upper wall 10 of the shield 11, which extends through the ventilating opening and is pivotally mounted upon the stationary hinge bracket 3 below the cowl. In detail, the shield has the depending rear wall 12 and the side walls 13 connecting the rear wall to the upper wall, there being a transverse reinforcing flange 14 at the lower edge of the rear wall. 15 are spaced brackets fixedly secured, as by spot welding to the rear wall 12 and pivotally connected to the depending struck-out ears 16 upon the base of the stationary hinge bracket.

17 is a handle having the return-bent upper end 18 which is fixedly secured to the rear wall 12 of the shield, the grip portion of this handle extending to a point below the rear wall 19 of the cowl so that it may be readily manipulated to rotatably adjust the ventilator cover by a person in the motor vehicle.

For locking the cover in its positions of rotative adjustment, there is the handle quadrant 20 fixedly secured to the front face of the rear wall 19, and arranged in substantially concentric relation to the pivots connecting the hinge brackets. This quadrant is provided with the longitudinally extending slot 21 at one side of which are the series of notches 22 adapted to be engaged in by the handle, which is resilient and so arranged that it maintains itself in the notch in which it is positioned.

From the above description, it will be seen that I have provided a simple construction of cowl ventilator, the parts of which may be and preferably are formed of stampings, and in which the cover pivot is located below and concealed by the cowl. Also, the ventilator reinforces the flange upon the cowl for preventing moisture from flowing down upon the cowl and into the ventilating opening. Furthermore, the handle in addition to being adapted to rotatably adjust the ventilator cover further functions to hold the cover in its positions of rotative adjustment.

What I claim as my invention is:

1. The combination with a cowl having an opening therein and a flange extending upwardly from the rear edge of the opening, a bracket plate secured directly to the inner face of said cowl at the rear edge of said opening and having leg portions secured to said cowl at the opposite ends of said opening, said bracket plate also having a flange projecting upwardly from its forward edge, said flange extending through the opening in the cowl and reinforcing the flange of the cowl at the rear edge of the opening, a cover for the opening in the cowl having marginal depending flanges, the flanges of said cover being of sufficient height to embrace the upwardly extending flange aforesaid and still contact with the upper side of the cowl on all sides of the opening therein, a shield projecting inwardly from said cover and pivotally connected to said bracket plate, said shield being formed from one piece of material and comprising a rear wall and forwardly extending side wings, said rear wall and side wings having flanges at one end secured directly to the inner face of said cover, and actuating means for said cover connected to the rear wall of said shield.

2. The combination with a cowl having an opening therein and a flange extending forwardly from the rear edge of the opening, a bracket plate secured directly to the inner face of said cowl at the rear edge of said opening and having portions secured to said cowl at the opposite ends of said opening, said bracket plate also having a flange projecting upwardly from its forward edge, said flange extending through the opening in the cowl and reinforcing the flange of the cowl at the rear edge of the opening, a cover for the opening in the cowl having marginal depending flanges, a shield projecting inwardly from said cover, said shield comprising a rear wall and forwardly extending side wings, said rear wall and side wings having flanges at one end secured directly to the inner face of said cover, brackets secured to the bracket plate aforesaid, brackets secured directly to the rear wall of the shield and pivotally connected to the last-mentioned brackets, and a member connected to the rear wall of said shield adapted to actuate said cover.

In testimony whereof I affix my signature.

HERMAN C. MAISE.